United States Patent [19]

Langston, Jr.

[11] 4,398,388
[45] Aug. 16, 1983

[54] HIGH BYPASS RATIO SUPPLEMENTAL FUEL INJECTION

[75] Inventor: Chandos E. Langston, Jr., Jupiter, Fla.

[73] Assignee: United Technologies Corporation, Hartford, Conn.

[21] Appl. No.: 226,579

[22] Filed: Jan. 21, 1981

Related U.S. Application Data

[63] Continuation-in-part of Ser. No. 754,770, Dec. 27, 1976, abandoned.

[51] Int. Cl.³ ............................................. F02K 3/10
[52] U.S. Cl. ....................................... 60/241; 60/261
[58] Field of Search .......... 60/241, 261, 262, 39.72 R, 60/39.74 R

[56] References Cited

U.S. PATENT DOCUMENTS

| | | | |
|---|---|---|---|
| 3,295,325 | 1/1967 | Nelson | 60/262 |
| 3,360,940 | 1/1968 | Rimmer | 60/261 |
| 3,485,045 | 12/1969 | Riecke | 60/749 |
| 3,595,024 | 7/1971 | Kohler et al. | 60/262 |
| 3,633,362 | 1/1972 | Sotheran et al. | 60/261 |
| 3,698,186 | 10/1972 | Beane et al. | 60/261 |
| 3,719,042 | 3/1973 | Chamberlain | 60/740 |
| 3,793,838 | 2/1974 | Nash | 60/261 |
| 3,826,586 | 7/1974 | Richards | 60/241 |

Primary Examiner—L. J. Casaregola
Attorney, Agent, or Firm—Jack N. McCarthy

[57] ABSTRACT

An afterburner on a turbofan or fan-jet engine contains a fuel system having a fuel control delivering fuel to a plurality of injection zones. As the power lever is advanced, for afterburner operation, fuel is delivered sequentially to the afterburner through different zones until it reaches the last zone. The last zone comprises a set of two axially spaced sprayrings located adjacent the outer wall of the afterburner, one spraying being located upstream of the other spraying. The downstream sprayring has a splash plate located radially inwardly from each nozzle to provide a barrier to the fuel spraying inwardly for directing a portion of the spray downstream over the outward radial portion of the afterburner near the afterburner wall. When fuel flow is directed to the last zone by the fuel control the fuel flows directly to the upstream sprayring, while fuel flow to the downstream sprayring is controlled by a valve which is closed at a lower range of bypass ratios and open at a higher range of bypass ratios to direct fuel thereto, for spraying adjacent the outer wall. Additional air is available at these higher bypass ratios adjacent the outer wall to permit burning of the fuel closer to the outer wall without adversely affecting the liner.

10 Claims, 5 Drawing Figures

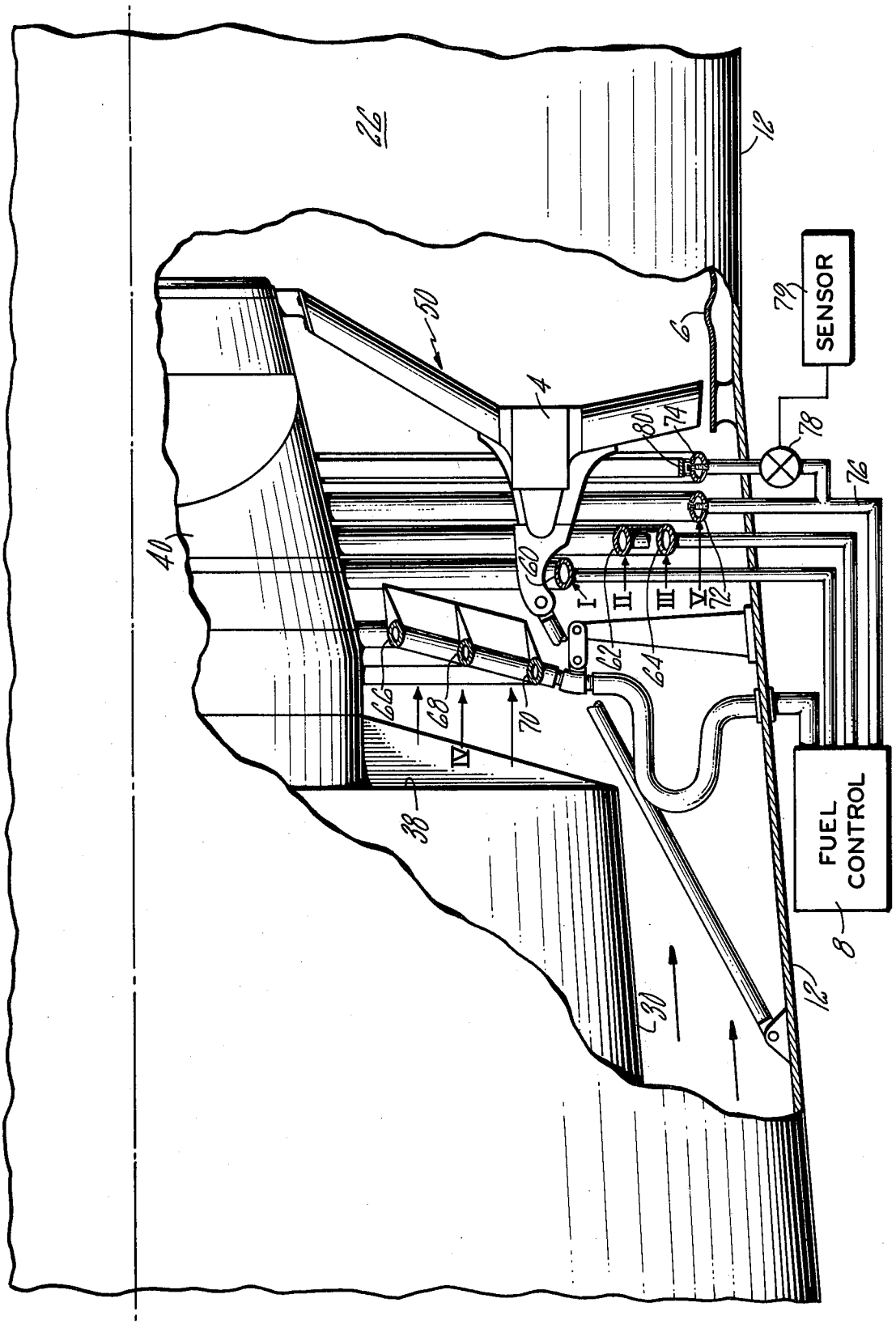

HIGH BYPASS RATIO SUPPLEMENTAL FUEL INJECTION

CROSS REFERENCE TO RELATED APPLICATIONS

This application is a continuation-in-part of U.S. application Ser. No. 754,770, filed Dec. 27, 1976 (abandoned).

BACKGROUND OF THE INVENTION

This invention relates to the use of afterburners with multiple fuel zones to obtain high afterburner efficiency in aircraft at supersonic speeds. The patents to Nelson, U.S. Pat. No. 3,269,115 and Riecke, U.S. Pat. No. 3,485,045, show afterburners for bypass engines wherein a plurality of fuel zones are used and a splash plate is shown in one of them. The patent to Chamberlain, U.S. Pat. No. 3,719,042 also shows the use of a splash plate. However, to date, it is still an undesirable characteristic of some augmented fan engines towards reduced augmentor efficiency with increased bypass ratios at supersonic speeds, greater than a flight Mach No. of 1.

SUMMARY OF THE INVENTION

A primary object of the present invention is to prevent reduced augmentor efficiency with increased bypass ratios.

In accordance with the present invention, a fuel system is provided which directs fuel to the afterburner in a plurality of injection zones, a last zone having two spaced sprayrings is located adjacent the outer wall of the afterburner, one sprayring continuously directing fuel to the augmentor when the zone is on while said second sprayring is closed at a lower range of bypass ratios and opened while at high bypass ratios to spray fuel adjacent the outer wall.

It is another object of this invention to provide improved fuel distribution across the flameholder at high bypass ratios.

It is a further object of this invention to provide means for diverting a fuel spray so that it will be directed axially adjacent the outer wall of an afterburner at high bypass ratios.

BRIEF DESCRIPTION OF THE DRAWINGS

FIG. 2 is an enlarged view showing the afterburner fuel nozzle means and fuel control;

FIG. 5 is a graph showing an approximate relationship between bypass ratio and Mach Nos. for a bypass engine with afterburner for Mach Nos. between 1 and 2. While the solid line represents an altitude of 30,000 feet, the dot and dash lines on either side thereof represent the outer limits of a family of altitude curves from sea level to maximum design altitude. It is to be understood that test results for a particular engine need to be taken to achieve an accurate graph for that engine.

DESCRIPTION OF THE PREFERRED EMBODIMENT

Figure 1:
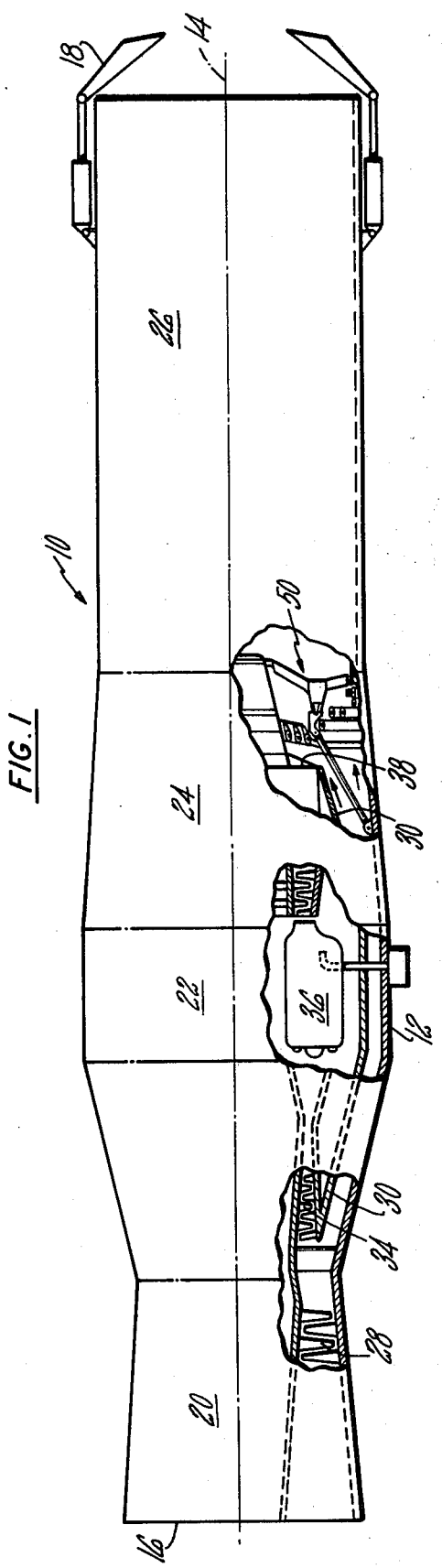
FIG. 1 is a view of a turbofan engine having an afterburner showing the location of the afterburner fuel nozzle means.
Figure 4:
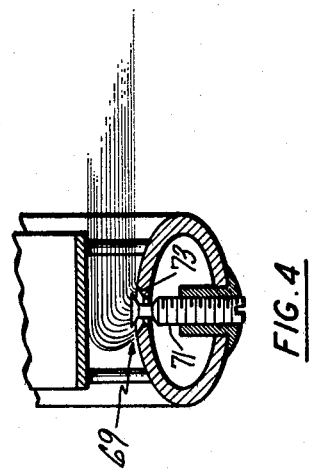
FIG. 4 is an enlarged view of a conventional nozzle means spraying fuel radially inwardly against a splash plate directing fuel flow closer to the outer wall of the afterburner.
Figure 3:
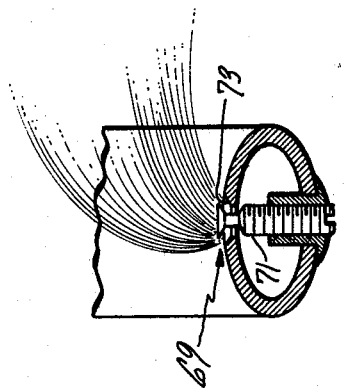
FIG. 3 is an enlarged view of a conventional nozzle means spraying fuel radially inwardly.

Referring to FIG. 1, we see on engine 10, which is of the turbofan or fan-jet type as shown in U.S. Pat. No. 3,269,115. Engine 10 includes engine outer case 12 which is of circular cross section and concentric about axis 14 and which includes air inlet section 16 at its forward end and variable area exhaust nozzle 18 at its after or rearward end. The components of engine 10 include compressor section 20, burner section 22, turbine section 24 and afterburner section 26. In operation, air enters inlet section 16 and is compressed in the fan portion 28 of compressor section 20. Fan portion 28 includes a plurality of alternately positioned stationary vanes and rotating blades. After passing through fan portion 28, a portion of the compressed air then passes into annular bypass air passage, or duct, 30, and is discharged therefrom into afterburner section 26. The remainder of the air from fan portion 28 passes through high pressure compressor section 34, which comprises a plurality of alternately positioned stationary vanes and rotating blades, for further compression therein. After leaving high pressure compressor 34, the compressed air is heated in burner section 22 due to combustion which takes place in combustion chambers 36, which may be either of the conventional can or annular type, and the heated gas is then passed through turbine section 24, where sufficient energy is extracted therefrom to drive fan portion 28 and high pressure compressor 34, and then is discharged through annular gas passage 38 into afterburner 26 for eventual discharge to atmosphere through variable area exhaust nozzle 18. Variable area exhaust nozzle 18 is of conventional design and may be of the type more fully disclosed in U.S. Pat. Nos. 3,032,974; 3,057,150; 3,062,003; 2,910,829; 2,974,480 or 2,846,841 while engine 10 may be of the type shown in U.S. Pat. Nos. 2,292,203; 2,978,865 and 2,979,900 to which reference may be had.

A reheat process takes place in afterburner 26 and this requires the injection of additional fuel into afterburner 26 and the establishment of a flow stabilization zone in the afterburner so that combustion may take place therein. Flameholder 50 performs the flame stabilization zone creating function.

Referring to FIG. 2, we see flameholder 50 and its support mechanism in greater particularity. Flameholder 50 is supported between engine centerbody 40 and outer case 12 and serves to form a flow stabilization zone downstream thereof. The afterburner section 26 is formed having a cooling liner 6 spaced inwardly from the outer case 12, the forward end of the liner 6 being located ahead of the flame-holder 50.

A fuel system including a fuel control 8 delivers scheduled fuel supplied to five fuel injection zones, I, II, III, IV and V. As the afterburner is ignited, fuel is directed to Zone I by control 8 adjacent the flameholder pilot which comprises a conventional sprayring 60, having a plurality of fuel nozzles 69 therearound. Each fuel nozzle 69 comprises a stem 71 and an opening 73 in the side of the sprayring which acts as a valve seat. Such a nozzle is described in U.S. Pat. No. 3,698,186. As the power lever is advanced fuel is also directed to Zone II to provide combustion in a larger portion of the augmentor flow stream which comprises a conventional sprayring 62 with nozzles 69. Further advance of the power lever directs fuel to Zone III and then Zone IV. Zone III comprises a conventional sprayring 64 and Zone IV comprises a set of three radially spaced conventional sprayrings 66, 68 and 70, each having nozzles 69. Complete advance of the power lever directs fuel to the last Zone V.

Zone V comprises a set of two axially spaced conventional sprayrings 72 and 74, sprayring 72 being located upstream of sprayring 74. The fuel supply line 76 from the fuel control is connected directly to sprayring 72 for conventional operation. Fuel is injected from the nozzles in sprayrings 72 to flow down the afterburner a spaced distance from liner 6 so that at a low range of bypass ratios, burning within the afterburner will not adversely affect the liner 6. These nozzles can be of the type for directing fuel radially inwardly. At a predetermined time, to be hereinafter described, a valve 78 is opened in a supplemental fuel line connecting line 76 to sprayring 74. This permits the nozzles in sprayring 74 to direct fuel downstream adjacent the outer wall outboard of fuel already being injected into the engine from nozzles in sprayring 72 to provide burning closer to the outer wall. A splash plate 80 is located radially inwardly from each nozzle directing fuel radially inwardly in the sprayring 74 to stop the fuel from spraying inwardly any further. This spray is then carried downstream over the outward radial portion of the flameholder 50 adjacent the wall of the liner 6. This action prevents a decrease in engine performance in that it provides better fuel distribution at the higher bypass ratios.

In tests run on a bypass engine having an afterburner above flight Mach Nos. of 1, the bypass ratio increased a significant amount with an increase in Mach No. A representative relationship is shown in FIG. 5 for a particular bypass engine with afterburner at a particular altitude. While the curve changes for different altitudes, the family of curves (falling between dot-and-dash lines) remains close enough to figure out a range of bypass ratios for a particular engine at a particular Mach No. In the art of aircraft engine design, this type of correlation would not amount to undue experimentation. The vast amount of testing and experimentation done to arrive at a design for a bypass engine having an afterburner must be known to one skilled in the art.

It can be seen that as all zones I to V are open and the aircraft passes Mach No. 1, that the bypass ratio will rise substantially with a rise in Mach No., regardless of altitude. This rise provides an excess amount of bypass air in the engine of the afterburner around the outer wall of liner 6 downstream of the bypass duct. To provide improved fuel distribution across the flameholder downstream of the bypass duct 30, fuel from zone V is spread out to come closer to the wall of the liner 6, with care being taken to prevent the burning of the liner 6. One method of determining at what predetermined time valve 78 can be turned on would be to sense a Mach No., by a device 79, which indicates a range of bypass ratios providing an amount of excess air which, when burned with the fuel injected through the nozzles in sprayring 74, would not adversely affect the outer wall of the liner 6. In a simplified operation a pilot could look at his Mach meter and turn the valve on manually by a switch.

Such a Mach No. could be selected for turning on a valve 78 for a particular bypass engine having an afterburner in the following manner:

(1) thermocouples are placed on liner 6 to indicate the temperature felt by the liner;

(2) the engine is run at various altitudes throughout the flight envelope, at a sustained high design Mach No., with all the zones open along with valve 78;

(3) leaving the engine controls set, conditions are changed to decrease Mach No.;

(4) thermocouples are monitored to determine when the design temperature limit for the liner material has been reached at each altitude; at this point each Mach No. is read and the highest Mach No. which was sensed is used during flight to open valve 78.

The above procedure could be carried out in an altitude test facility simulating the desired flight conditions.

The valve 78 can be turned off by device 79 at approximately the same Mach No. as the aircraft reduces its speed. Further, the pilot could manually operate a switch to close valve 78 when desired.

If desired, the device 79 could also detect other parameters such as altitude, pressure or temperature to provide additional vernier control over the actuation of valve 78 to further optimize performance at all altitudes.

Alternatively, some digital electronic engine controls provide a means for determining bypass ratio. Device 79 could receive a signal from such a control and activate valve 78 as a direct function of bypass ratio.

I claim:

1. In combination in a bypass engine, a core engine, a bypass duct around said engine, said core engine having a first exhaust means, said bypass duct having a second exhaust means, an afterburner, said first and second exhaust means opening into said afterburner, said afterburner having an outer wall, flameholder means in said afterburner downstream of said first and second exhaust means, afterburner fuel supply means, said afterburner fuel supply means comprising a plurality of nozzle means for injecting fuel to said afterburner at a plurality of predetermined locations and at predetermined times, fuel control means including means for directing fuel to each nozzle means at each of said plurality of predetermined locations in a desired sequence, the nozzle means being the last in the sequence having first nozzles for directing fuel into said afterburner at a spaced distance from the outer wall of said afterburner, second nozzles for directing fuel into said afterburner at a location within said spaced distance, means for directing fuel to said second nozzles at a bypass ratio which will provide excess air for the burning of the fuel to prevent adversely affecting the outer wall, said fuel control means having a first conduit means for directing fuel to said first nozzles, second conduit means connecting said first conduit means to said second nozzles, said means for directing fuel to said second nozzles including valve means in said second conduit means for controlling the flow of fuel to said second nozzles, means for opening said valve means when a Mach No. is reached which indicates a bypass ratio containing excess air which is sufficient to burn the fuel directed into the afterburner without adversely affecting the outer wall.

2. In combination in a bypass engine, a core engine, a bypass duct around said engine, said core engine having a first exhaust means, said bypass duct having a second exhaust means, an afterburner, said first and second exhaust means opening into said afterburner, said afterburner having an outer wall, flameholder means in said afterburner downstream of said first and second exhaust means, afterburner fuel supply means, said afterburner fuel supply means comprising a plurality of nozzle means for injecting fuel to said afterburner at a plurality of predetermined locations and at predetermined times, fuel control means including means for directing fuel to each nozzle means at each of said plurality of predetermined locations in a desired sequence, the nozzle means being the last in the sequence having first nozzles for directing fuel into said afterburner at a spaced distance from the outer wall of said afterburner, second nozzles for directing fuel into said afterburner at a location within said spaced distance, means for directing fuel to said second nozzles at a bypass ratio which will provide excess air for the burning of the fuel to prevent adversely affecting the outer wall, said means for directing said fuel to said second nozzles including valve means for controlling the flow of fuel to said second nozzles, means for opening said valve means by sensing a Mach No. which indicates a bypass ratio containing excess air which is sufficient to burn the fuel directed into the afterburner without adversely affecting the outer wall.

3. A combination as set forth in claim 1 wherein said Mach No. is greater than 1.

4. A combination as set forth in claim 2 wherein said Mach No. is greater than 1.

5. In combination in a bypass engine, a core engine, a bypass duct around said engine, said core engine having a first exhaust means, said bypass duct having a second exhaust means, an afterburner, said first and second exhaust means opening into said afterburner, said afterburner having an outer wall, flameholder means in said afterburner downstream of said first and second exhaust means, afterburner fuel supply means, said afterburner fuel supply means comprising a plurality of nozzle means for injecting fuel to said afterburner at a plurality of predetermined locations and at predetermined times, fuel control means including means for directing fuel to each nozzle means at each of said plurality of predetermined locations in a desired sequence, the nozzle means being the last in the sequence having first nozzles for directing fuel into said afterburner at a spaced distance from the outer wall of said afterburner, second nozzles for directing fuel into said afterburner at a location within said spaced distance, means for directing fuel to said second nozzles at a bypass ratio which will provide excess air for the burning of the fuel to prevent adversely affecting the outer wall, said fuel control means having a first conduit means for directing fuel to said first nozzles, second conduit means connecting said first conduit means to said second nozzles, said means for directing fuel to said second nozzles including valve means in said second conduit means for controlling the flow of fuel to said second nozzles, means for opening said valve means by sensing a Mach No. which indicates a bypass ratio containing excess air which is sufficient to burn the fuel directed into the afterburner from said second nozzles without adversely affecting the outer wall.

6. In combination in a bypass engine, a core engine, a bypass duct around said engine, said core engine having a first exhaust means, said bypass duct having a second exhaust means, an afterburner, said first and second exhaust means opening into said afterburner, said afterburner having an outer wall, flameholder means in said afterburner downstream of said first and second exhaust means, afterburner fuel supply means, said afterburner fuel supply means comprising a plurality of nozzle means for injecting fuel to said afterburner at a plurality of predetermined locations and at predetermined times, fuel control means including means for directing fuel to each nozzle means at each of said plurality of predetermined locations in a desired sequence, the nozzle means being the last in the sequence having first nozzles for directing fuel into said afterburner at a spaced distance from the outer wall of said afterburner, second nozzles for directing fuel into said afterburner at a location within said spaced distance, means for directing fuel to said second nozzles at a bypass ratio which will provide excess air for the burning of the fuel to prevent adversely affecting the outer wall, said means for directing said fuel to said second nozzles including valve means for controlling the flow of fuel to said second nozzles, means for opening said valve means when a Mach No. is reached which indicates a bypass ratio containing excess air which is sufficient to burn the fuel directed into the afterburner from said second nozzles without adversely affecting the outer wall.

7. In combination in a bypass engine, a core engine, a bypass duct around said engine, said core engine having a first exhaust means, said bypass duct having a second exhaust means, an afterburner, said first and second exhaust means opening into said afterburner, said afterburner having an outer wall, flameholder means in said afterburner downstream of said first and second exhaust means, afterburner fuel supply means, said afterburner fuel supply means comprising a plurality of nozzle means for injecting fuel to said afterburner at a plurality of predetermined locations and at predetermined times, fuel control means including means for directing fuel to each nozzle means at each of said plurality of predetermined locations in a desired sequence, the nozzle means being the last in the sequence having first nozzles for directing fuel into said afterburner at a spaced distance from the outer wall of said afterburner, second nozzles for directing fuel into said afterburner at a location within said spaced distance, means for directing fuel to said second nozzles, means for receiving a signal indicating a bypass ratio containing excess air which is sufficient to burn fuel directed into the afterburner from said second nozzles without adversely affecting the outer wall, said last named means actuating said means for directing fuel to said second nozzles at said signal to direct fuel to said second nozzles after fuel has been directed to said first nozzles, said fuel directed to said second nozzles being a part of the fuel directed to said first nozzles thereby spreading out the fuel to come closer to the outer wall.

8. In combination in a bypass engine, a core engine, a bypass duct around said engine, said core engine having a first exhaust means, said bypass duct having a second exhaust means, an afterburner, said first and second exhaust means opening into said afterburner, said afterburner having an outer wall, flameholder means in said afterburner downstream of said first and second exhaust means, afterburner fuel supply means, said afterburner fuel supply means comprising a plurality of nozzle means for injecting fuel to said afterburner at a plurality of predetermined locations and at predetermined times, fuel control means including means for directing fuel to each nozzle means at each of said plurality of predetermined locations in a desired sequence, a power lever having an advance movement for actuating said fuel control to direct fuel to each nozzle means in a desired sequence through the last nozzle means, the nozzle means being the last in the sequence having first nozzles for directing fuel into said afterburner at a spaced distance from the outer wall of said afterburner, second nozzles for directing fuel into said afterburner at a location within said spaced distance, means for automatically directing fuel to said second nozzles above Mach No. 1 and after fuel has been directed to said first nozzles at a bypass ratio which will provide excess air for the burning of the fuel from said second nozzles to prevent adversely affecting the outer wall.

9. A combination as set forth in claim 8 wherein said means for automatically directing fuel includes means for receiving a signal indicating bypass ratio.

10. A combination as set forth in claim 9 wherein said means for receiving a signal includes means to sense Mach No.

* * * * *